(12) United States Patent
Heldreth, Jr.

(10) Patent No.: US 10,874,102 B2
(45) Date of Patent: Dec. 29, 2020

(54) USE OF ABA/METHYL JASMONATE/SUGAR TO INCREASE TERPENE AND CANNABINOID PRODUCTION IN CANNABIS SATIVA

(71) Applicant: David Alan Heldreth, Jr., Seattle, WA (US)

(72) Inventor: David Alan Heldreth, Jr., Seattle, WA (US)

(73) Assignee: David Alan Heldreth, Jr., Bellevue, WA (US)

( * ) Notice: Subject to any disclaimer, the term of this patent is extended or adjusted under 35 U.S.C. 154(b) by 0 days.

(21) Appl. No.: 15/943,703

(22) Filed: Apr. 3, 2018

(65) Prior Publication Data
US 2018/0279611 A1   Oct. 4, 2018

Related U.S. Application Data

(60) Provisional application No. 62/481,105, filed on Apr. 3, 2017.

(51) Int. Cl.
*A01N 37/42* (2006.01)
*A01N 37/08* (2006.01)
*A01N 43/08* (2006.01)
*C05F 11/10* (2006.01)
*C05G 3/00* (2020.01)

(52) U.S. Cl.
CPC ............. *A01N 37/42* (2013.01); *A01N 37/08* (2013.01); *A01N 43/08* (2013.01); *C05F 11/10* (2013.01); *C05G 3/00* (2013.01)

(58) Field of Classification Search
None
See application file for complete search history.

(56) References Cited

PUBLICATIONS

Chen, Effects of Main Environment Factors on THC Accumulation in Different Development Stages of Cannabis sativa,, Journal of West China Forestry Science, vol. 45 No. 3, pp. 44-50, 2016 (Year: 2016).*
Nigel Salazar, Marijuana Carbohydrates Boost Growth, Root Function, Bud Size, & THC, Copyright, BigBudsMag.com, 2015 (Year: 2015).*

* cited by examiner

*Primary Examiner* — Alton N Pryor

(57) ABSTRACT

The invention involves the use of a combination of s-abscisic acid (S-ABA), methyl jasmonate (MJ), glucose, sucrose and fructose to raise the level of cannabinoids and terpenes (flavor and scent molecules) in the *Cannabis Sativa* plant.

10 Claims, 1 Drawing Sheet

| Figure 1 | THC | Terpenes | |
|---|---|---|---|
| Control grow | 21.2% | 2.5% | |
| ABA/sugars | 21.21% | 2.6% | |
| ABA/MJ/sugars | 23.7% | 3.6% | |
| | | | |
| | | | |

USE OF ABA/METHYL JASMONATE/SUGAR TO INCREASE TERPENE AND CANNABINOID PRODUCTION IN CANNABIS SATIVA

This patent (application) claims prior filing date to provisional patent. Please reference provisional patent title: The use of a combination of s-abscisic acid (S-ABA), methyl jasmonate (MJ), and sugars to raise the level of cannabinoids and terpenes in the *Cannabis Sativa* plant. Application No. 62/481,105.

FIELD OF THE INVENTION

The present invention is directed to the preharvest treatment of *Cannabis Sativa* with a combination of S-ABA, MJ, glucose, sucrose and fructose to increase the level of cannabinoids and terpenes (flavor and scent molecules) such as, but not limited to: tetrahydrocannabinol (THC), cannabidiol (CBD), cannabichromene (CBC), limonene, linalool, alpha-pinene, myrcene.

BACKGROUND OF THE INVENTION

Cannabinoids and terpenes of the *Cannabis Sativa* plant are currently being developed for medicinal and recreational uses throughout the United States. The ability to increase cannabinoid and terpene production in a harvest of *Cannabis Sativa* plants could achieve great return on investment for a business, while also improving on the purity of the pharmaceutical extraction or product obtained from the *Cannabis Sativa* plant.

There are currently no products on market or coming that raise cannabinoid and terpene production in the *Cannabis Sativa* plant. The herein described invention will fill a gap in current propagation techniques by using a combination of S-ABA, MJ, glucose, sucrose and fructose to increase the level of cannabinoids and terpenes (flavor and scent molecules).

SUMMARY OF THE INVENTION

The present invention is directed to the preharvest treatment of *Cannabis Sativa* with a combination of S-ABA, MJ, glucose, sucrose and fructose to increase the level of cannabinoids and terpenes (flavor and scent molecules) such as, but not limited to: tetrahydrocannabinol (THC), cannabidiol (CBD), cannabichromene (CBC), limonene, linalool, alpha-pinene. Increasing cannabinoid and terpene levels is the main goal of the cultivation of *Cannabis Sativa* for medical or recreational use.

BRIEF DESCRIPTION OF THE DRAWING:

FIG. 1 shows the levels of THC and terpenes found in cannabis plants which have been treated with ABA, Sugars and Methyl Jasmonate compared to control untreated plants.

DRAWING SUMMARY

Experiments were conducted on the application of S-ABA and sugars vs S-ABA, MJ and sugars. Both S-ABA and ABA/MJ solutions raised cannabinoid and terpene levels compared with controls, but the ABA/MJ concentration achieved higher concentrations. See attached drawing (FIG. 1) for data on application effects.

DETAILED DESCRIPTION OF THE INVENTION

The present invention involves a method of use of a combination of abscisic acid, methyl jasmonate, glucose, sucrose and fructose to raise the level of cannabinoids and terpenes (flavor and scent molecules) in the *Cannabis Sativa* plant such as, but not limited to: tetrahydrocannabinol (THC), cannabidiol (CBD), cannabichromene (CBC), myrcene, limonene, linalool, alpha-pinene.

The mixture(s) (S-ABA, MJ, glucose, sucrose and fructose) are mixed with water, oil or other solutions and applied to the *Cannabis Sativa* by foliar sprays including electrostatic spray application to the leaves and flowers or by application to the roots of the plants through irrigation or fertigation methods.

Experiments were conducted on the application of S-ABA and sugars vs S-ABA, MJ and sugars. Both S-ABA and ABA/MJ treatments raised cannabinoid and terpene levels compared with controls, but the ABA/MJ treatment achieved higher concentrations. See attached drawing (FIG. 1) for data on application effects.

The invention claimed is:

1. A method of increasing the level of cannabinoids and terpenes or flavor and scent molecules in a Cannabis Sativa plant comprising applying a combination of s-abscisic acid, methyl jasmonate, glucose, sucrose and fructose to the roots or as a foliar spray to leaves or flowers of the plant.

2. A method of claim 1 wherein the combination is applied at the seedling, vegetative or flowering growth stage of the *cannabis sativa plant*.

3. A method of claim 1 wherein the abscisic acid, methyl jasmonate, glucose, sucrose and fructose are derived from plant based extracts or synthetic sources.

4. A method of increasing drought tolerance, fungi and bacteria inoculation rates and the level of cannabinoids and terpenes or flavor and scent molecules in the *Cannabis Sativa* plant comprises applying a combination of 20-200 mg s-abscisic acid, 1-5 mg methyl jasmonate, glucose, sucrose and fructose per liter of water to the roots of the plant or as a foliar spray to the leaves of the plant at vegetative stage of the growth.

5. A method of increasing the level of cannabinoids and terpenes or flavor and scent molecules in the *Cannabis Sativa* plant comprising applying a combination of 20-200 mg s-abscisic acid, 1-100 mg methyl jasmonate, glucose, sucrose and fructose per liter of water to the roots of the plant or as a foliar spray to leaves and flowers of the plant.

6. The method of claim 5 wherein the abscisic acid, methyl jasmonate, glucose, sucrose and fructose are derived from plant based extracts.

7. The method of claim 5 wherein the foliar spray is applied once the daytime photoperiod has ended.

8. The method of claim 5 wherein the foliar or a root spray of the combination is applied during the flowering productive phase of the *Cannabis Sativa* plant.

9. The method of claim 5 wherein the foliar or a root spray of the combination is applied during the vegetative phase of the *Cannabis Sativa* plant.

10. The method of claim 3 or 6 wherein the plant based extracts are derived from a group of birch, maple, walnut, jasmine or yucca trees.

* * * * *